United States Patent
Chang

(10) Patent No.: US 7,746,420 B2
(45) Date of Patent: Jun. 29, 2010

(54) LIQUID CRYSTAL DISPLAY HAVING A FIXING MEMBER COMPRISING A PRESSING PROTRUSION AND A WINDOW INTO WHICH THE PRESSING PROTRUSION EXTENDS

(75) Inventor: Chih-Ching Chang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 86 days.

(21) Appl. No.: 11/985,257

(22) Filed: Nov. 13, 2007

(65) Prior Publication Data

US 2008/0111940 A1    May 15, 2008

(30) Foreign Application Priority Data

Nov. 10, 2006   (TW) .............................. 95141779 A

(51) Int. Cl.
*G02F 1/1333*   (2006.01)
(52) U.S. Cl. .......................................... 349/60; 349/58
(58) Field of Classification Search ................... 349/60, 349/58
See application file for complete search history.

(56) References Cited

U.S. PATENT DOCUMENTS

| | | | | |
|---|---|---|---|---|
| 6,975,368 B2* | 12/2005 | Lee | ............................... | 349/58 |
| 7,050,127 B2* | 5/2006 | Ishiwa | ......................... | 349/58 |
| 7,234,945 B2* | 6/2007 | Azuma et al. | ................. | 439/67 |
| 2003/0156036 A1* | 8/2003 | Stuetzler | ..................... | 340/665 |
| 2005/0259191 A1* | 11/2005 | Park et al. | ...................... | 349/58 |
| 2006/0158580 A1* | 7/2006 | Lai et al. | ...................... | 349/58 |
| 2006/0268190 A1 | 11/2006 | Yu et al. | | |
| 2007/0273806 A1* | 11/2007 | Lin et al. | ....................... | 349/58 |

* cited by examiner

*Primary Examiner*—Andrew Schechter
*Assistant Examiner*—Dennis Y Kim
(74) *Attorney, Agent, or Firm*—Wei Te Chung

(57) ABSTRACT

An exemplary liquid crystal display (LCD) (200) includes an LCD panel (210) including a first glass substrate (212) and a second glass substrate (214) parallel to the first glass substrate; a backlight module (220) includes a frame (222) accommodating the LCD panel; and a fixing member (240) attached to the frame of the backlight module and resiliently holding an end portion of the LCD panel in position in the frame.

14 Claims, 5 Drawing Sheets

LIQUID CRYSTAL DISPLAY HAVING A FIXING MEMBER COMPRISING A PRESSING PROTRUSION AND A WINDOW INTO WHICH THE PRESSING PROTRUSION EXTENDS

CROSS REFERENCE TO RELATED APPLICATION

This application claims the benefit of a related Taiwan application no. 095141779 filed in Taiwan on Nov. 10, 2006. The contents of the Taiwan application are incorporated herein by reference.

FIELD OF THE INVENTION

The present invention relates to backlight modules of liquid crystal displays (LCDs); and more particularly to an LCD including a backlight module with a fixing member.

GENERAL BACKGROUND

LCDs are commonly used as displays for compact electronic apparatuses. This is because they not only provide good quality images with little power consumption, but also they are very thin. The liquid crystal in an LCD does not emit any light itself. The liquid crystal has to be lit by a light source so as to clearly and sharply display text and images. Thus, a backlight module is generally needed for an LCD.

Referring to FIG. 6, a typical LCD 100 includes an LCD panel 110, a backlight module 120 opposite to the LCD panel 110, and a flexible printed circuit board (FPCB) 130. The LCD panel 110 includes a first glass substrate 112, and a second glass substrate 114 parallel to the first glass substrate 112.

The backlight module 120 includes a first diffusing sheet 121, a prism sheet 123, a second diffusing sheet 125, a light guide plate 127, a frame 122, and a reflective sheet 129, arranged generally in that order from top to bottom. The backlight module 120 further includes four light sources 190 disposed adjacent to an end edge of the light guide plate 127.

Referring also to FIG. 7 and FIG. 8, when the LCD 100 is assembled, the LCD panel 110, the first diffusing sheet 121, the prism sheet 123, the second diffusing sheet 125, the light guide plate 127, and the reflective sheet 129 are accommodated in the frame 122. A terminal (not labeled) of the FPCB 130 is electrically connected to an exposed side portion of the second glass substrate 114. A main printed circuit board (PCB) 151 is positioned at a side of the backlight module 120 far away from the LCD panel 110. The FPCB 130 is bent down and around, and other terminal (not labeled) of the FPCB 130 is connected to the PCB) 151. When the LCD 100 has been assembled, a second position of the FPCB 130 is that as shown in FIG. 8 in phantom with the reference numeral 131.

When the FPCB 131 is bent down and around, it exerts a pulling force on the side portion of the second glass substrate 114. Therefore that side of the LCD panel 110 is pulled up slightly away from the backlight module 120. As a result, the side of the LCD panel 110 connected to the FPCB 130 is elevated at an angle, and is higher than corresponding opposite side walls 124 of the frame 122. Because the LCD panel 110 is obliquely raised, subsequent further assembly of the LCD 100 may be faulty. Furthermore, the elastic force generated by the bent FPCB make the LCD 100 has no reliability.

What is needed, therefore, is an LCD that can overcome the above-described deficiencies.

SUMMARY

In one preferred embodiment, an LCD includes an LCD panel including a first glass substrate and a second glass substrate parallel to the first glass substrate; a backlight module includes a frame accommodating the LCD panel; and a fixing member attached to the frame of the backlight module and resiliently holding an end portion of the LCD panel in position in the frame.

Other aspects, novel features, and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
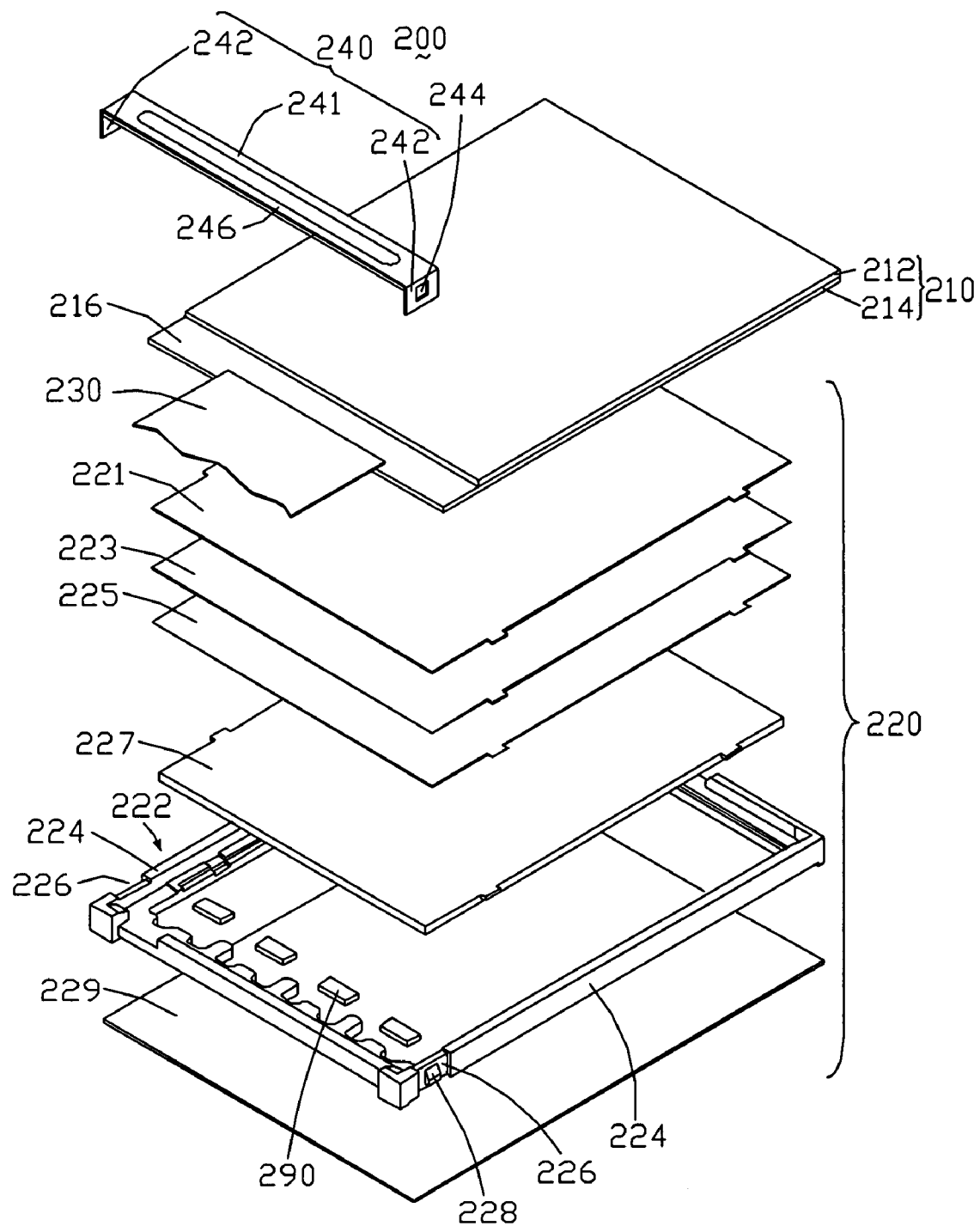
FIG. 1 is an exploded, isometric view of an LCD according to a first embodiment of the present invention, the LCD including a fixing bar.

Referring to FIG. 1, an LCD 200 according to a first embodiment of the present invention is shown. The LCD 200 includes an LCD panel 210, a backlight module 220, an FPCB 230, and a fixing bar 240.

The LCD panel 210 includes a first glass substrate 212 and a second glass substrate 214 parallel to the first substrate 212. The second glass substrate 214 includes an end portion 216. A driving integrated circuit (not shown) is disposed on the end portion 216, and a terminal of the FPCB 230 is connected to the end portion 216.

The backlight module 220 includes a first diffusing sheet 221, a prism sheet 223, a second diffusing sheet 225, a light guide plate 227, a frame 222, and a reflective sheet 229, arranged generally in that order from top to bottom. The backlight module 120 further includes at least a light source 290 disposed adjacent to an end edge of the light guide plate 227. In the illustrated embodiment, there are four light sources 290.

The frame 222 includes two side walls 224 opposite to each other. Each side wall 224 includes a generally L-shaped notch 226 at an end thereof near the light sources 290. A hook member 228 extends from a recessed outer portion of each side wall 224 at the notch 226 into the notch 226. The two hook members 228 are oriented symmetrically opposite to each other. The frame 222 can be made of plastic material.

Figure 2:
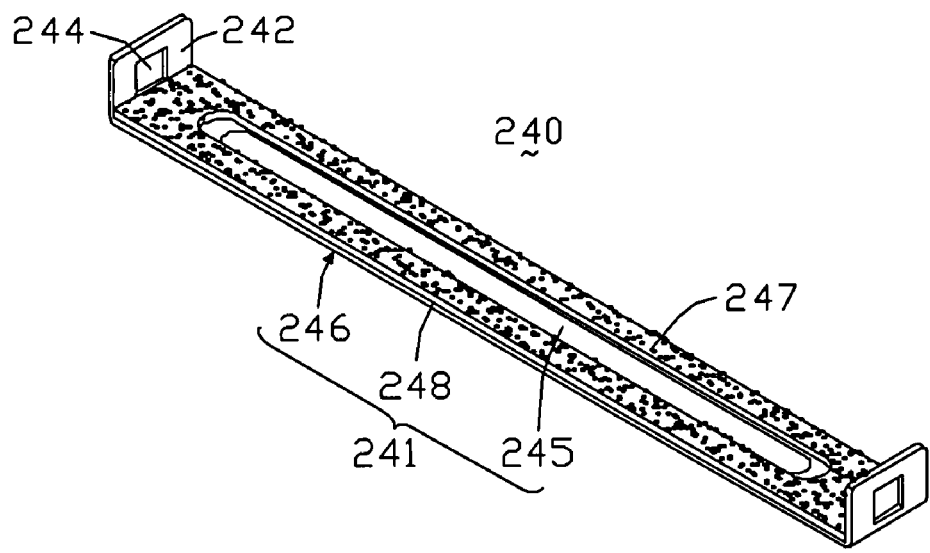
FIG. 2 is an enlarged, inverted view of the fixing bar of FIG. 1.

Referring also to FIG. 2, the fixing bar 240 includes a main body 241 and two clasping flanges 242 perpendicular to the main body 241. The two clasping flanges 242 extend vertically down from two opposite ends of the main body 241, and are parallel to each other. Each clasping flange 242 has a square opening 244 defined therein, corresponding to the hook member 228 of the respective side wall 224. A distance between the two clasping flanges 242 is slightly less than a total distance spanned by the two hook members 228. The fixing bar 240 can be made of elastic material such as metal or plastic. In alternative embodiments, the square openings 244 can have any other suitable shape.

Figure 4:
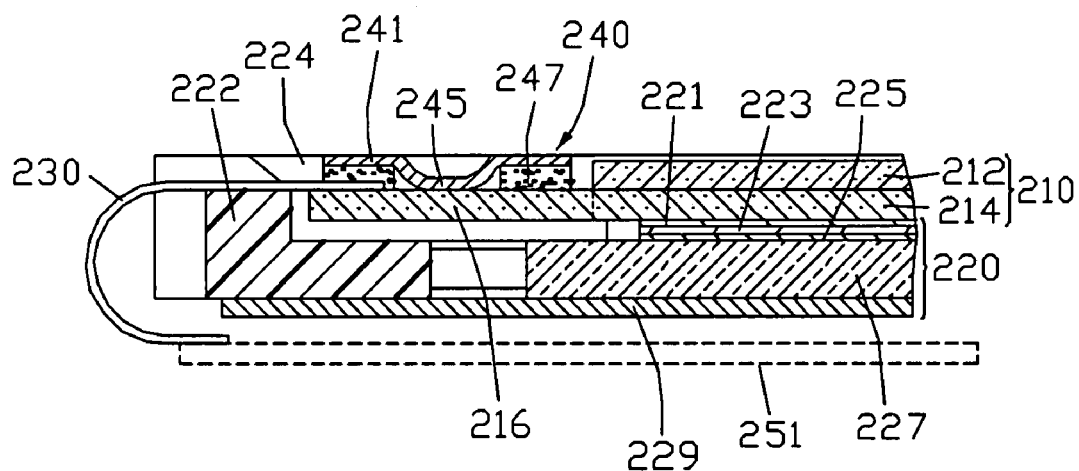
FIG. 4 is a cross-sectional view take along line IV-IV of FIG. 3.

The main body 241 includes a first surface 246 and a second surface 248 at opposite sides thereof, and an elongate pressing protrusion 245 formed along a middle portion of the second surface 248. The main body 241 further includes a buffer layer 247 attached on a peripheral portion of the second surface 248. The buffer layer 247 defines a window (not labeled) therein, into which the pressing protrusion 245 extends. The pressing protrusion 245 is formed by denting the first surface 246 toward the second surface 248. Thereby, an indentation is formed in the first surface 246 corresponding to the pressing protrusion 245 at the second surface 248. Referring also to FIG. 4, the pressing protrusion 245 has a generally curved transverse cross-section. In the illustrated embodiment, the cross-section has a central flat area configured for pressing on the end portion 216. A height of the pressing protrusion 245 is slightly less than a thickness of the buffer layer 247 when the fixing bar 240 is in a normal state. The buffer layer 247 can be made of elastic material such as foamed plastic or another kind of foam material. The pressing protrusion 245 is elastically deformable.

Figure 3:
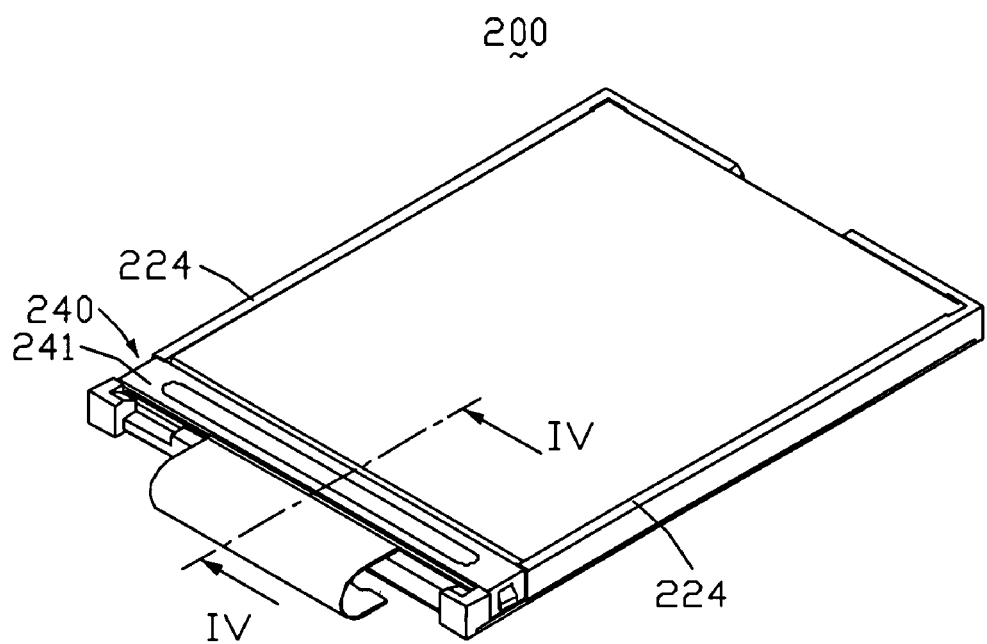
FIG. 3 is an assembled view of the LCD of FIG. 1.

Referring also to FIG. 3, when the LCD 200 is assembled, the light guide plate 227, the second diffusing sheet 225, the prism sheet 223, the first diffusing sheet 221 and the LCD panel 210 are accommodated in the frame 222, in that order from bottom to top. The reflective sheet 229 is attached to the frame 222 adjacent to a bottom of the light guide plate 227, for reflecting light escaping from the bottom of the light guide plate 227 back into the light guide plate 227. One terminal of the FPCB 230 is connected to the end portion 216 of the second glass substrate 214.

The fixing bar 240 is disposed above the end portion 216 of the second glass substrate 214, such that the buffer layer 247 is positioned between the main body 241 and the second glass substrate 214. When the main body 241 is pressed by an external force (e.g. a person's fingers) towards the LCD panel 210, the buffer layer 247 between the main body 241 and the second glass substrate 214 is compressed, and the pressing protrusion 245 of the fixing bar 240 contacts the end portion 216 and deforms slightly. At the same time, the clasping flanges 242 respectively move along the notches 226 of the frame 222 until the hook members 228 are respectively received in the square openings 244 of the clasping flanges 242. Thus the LCD panel 210 is clamped in position by the fixing bar 240. The first surface 246 of the main body 241 of the fixing bar 240 is substantially coplanar with top surfaces (not labeled) of the two side walls 224 of the frame 222. The clasping flanges 242 are firmly held in the notches 226 of the frame 222.

A main PCB 251 is disposed at a side of the backlight module 220 distant from the LCD panel 210. The FPCB 230 is bent down and around, and other terminal of the FPCB 230 is connected to an edge portion of the main PCB 251.

Even though the bent FPCB 230 generates an elastic force pulling on the end portion 216 of the second glass substrate 214, the end portion 216 is restricted by the fixing bar 240. Thus the LCD panel 210 is properly received in position in the frame 222. As a result, further assembly of the LCD 200 can be performed correctly and easily.

Figure 5:
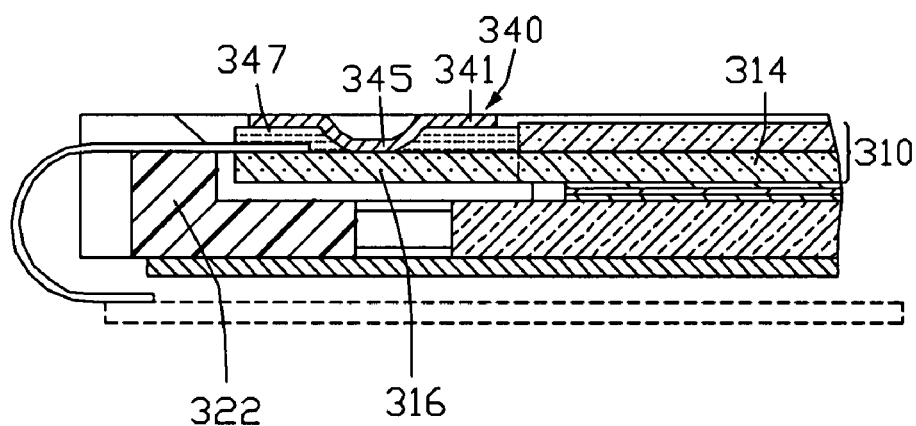
FIG. 5 is similar to FIG. 4, but showing a corresponding view in the case of an LCD according to a second embodiment of the present invention.
Figure 6:
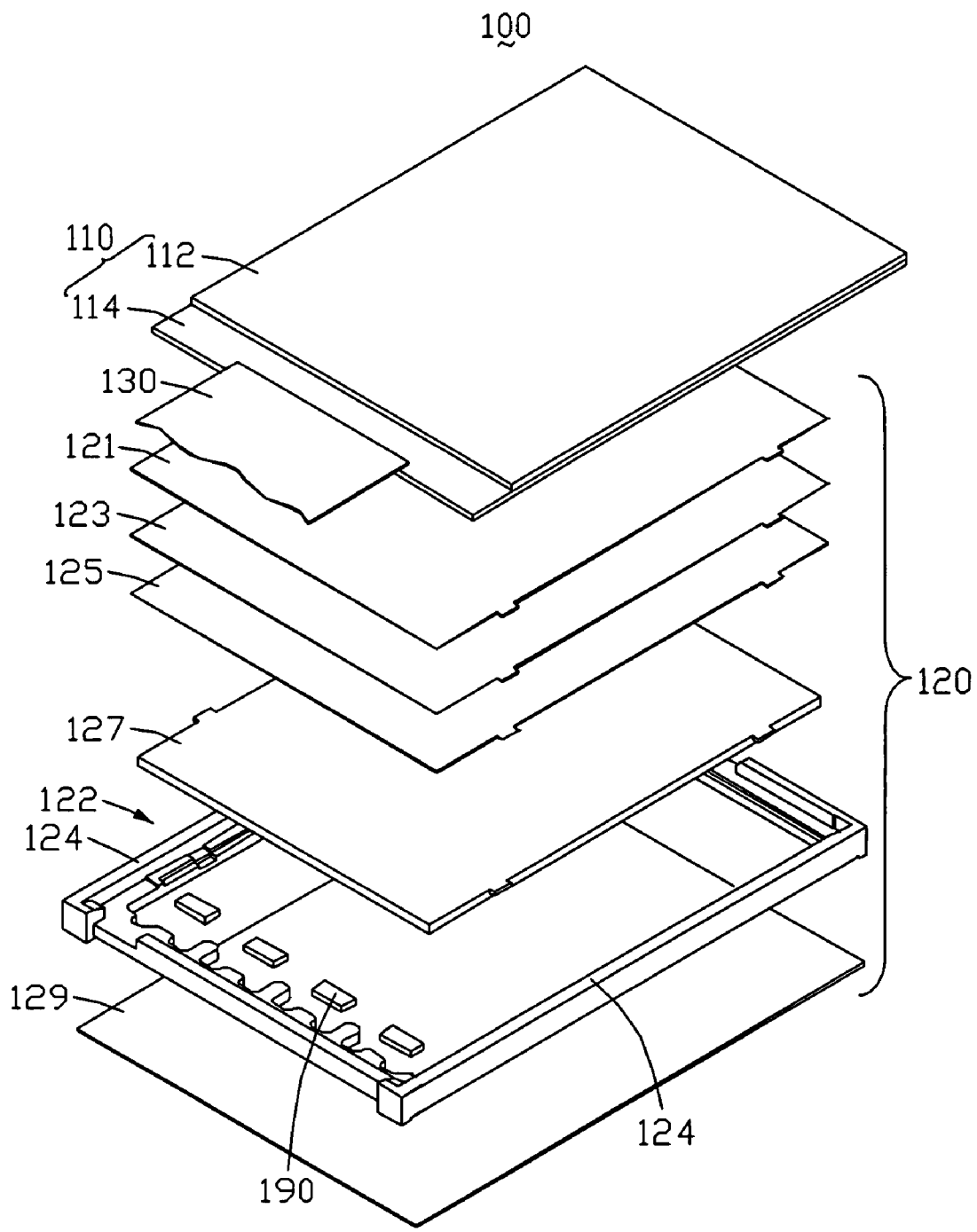
FIG. 6 is an exploded, isometric view of a conventional LCD.
Figure 7:
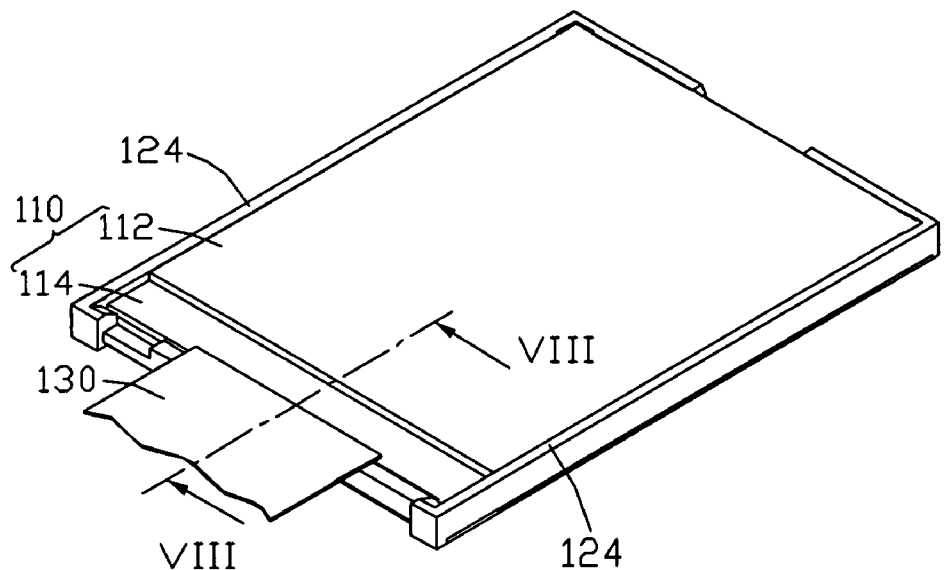
FIG. 7 is an assembled view of the LCD of FIG. 6.
Figure 8:
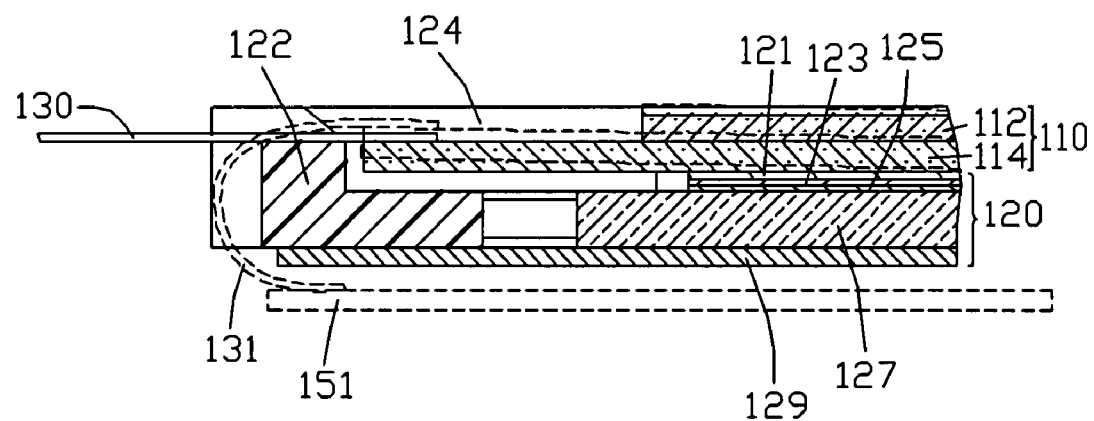
FIG. 8 is a cross-sectional view take along line VIII-VIII of FIG. 7.

Referring to FIG. 5, an LCD 300 according to a second embodiment of the present invention is similar to the LCD 200. However, the LCD 300 includes an LCD panel 310, and a fixing bar 340 having a pressing protrusion 345. The LCD panel 310 includes a second glass substrate 314 having an end portion 316. The LCD 300 further includes a protection layer 347 disposed at the end portion 316 of the second glass substrate 314 for protecting a plurality of conducting lines (not shown) on the end portion 316. The fixing bar 340 has no buffer layer attached thereon. The protection layer 347 is made of silica gel. Alternatively, the protection layer 347 can be made of another suitable protecting material.

When the main body 341 is pressed by an external force (e.g. a person's fingers) towards the LCD panel 310, the protection layer 347 between the main body 341 and the second glass substrate 314 is compressed. Then the LCD panel 310 is received in the frame 322 and clamped by the fixing bar 340. The LCD 300 can achieve advantages similar to those of the LCD 200.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display (LCD) comprising:
    an LCD panel comprising a first glass substrate and a second glass substrate parallel to the first glass substrate, the second glass substrate comprising an end portion;
    a backlight module comprising a frame accommodating the LCD panel, the frame comprising two side walls at opposite sides thereof, and each side wall comprising a notch near an end thereof and a hook member positioned in the notch; and
    a fixing member attached to the frame of the backlight module and resiliently holding the end portion of the second glass substrate in position in the frame, the fixing member pressing on the end portion, the fixing member comprising a main body, two clasping flanges extending from opposite ends of the main body, and a pressing protrusion, the clasping flanges attached to the side walls of the frame, each clasping flange comprising an opening, the clasping flanges being received in the notches with the hook members being engagingly received in the openings, and the main body of the fixing member comprising a first surface and a second surface at opposite sides thereof, the pressing protrusion being formed at the second surface;
    wherein the pressing protrusion is elastically deformed and resiliently presses the end portion of the second glass substrate, and the main body further comprises a buffer layer attached on the second surface, the buffer layer defining a window into which the pressing protrusion extends.

2. The LCD as claimed in claim 1, wherein a distance between the two clasping flanges is substantially the same as a distance between the two hook members.

3. The LCD as claimed in claim 1, wherein the pressing protrusion is elongated.

4. The LCD as claimed in claim 1, wherein the pressing protrusion has a generally curved transverse cross-section.

5. The LCD as claimed in claim 1, wherein the pressing protrusion defines a corresponding indentation at the first surface.

6. The LCD as claimed in claim 1, wherein the buffer layer is made of elastic material, and the buffer layer is compressed such that a thickness of the buffer layer is substantially the same as a height of the pressing protrusion.

7. The LCD as claimed in claim 1, wherein the buffer layer is made of foamed plastic.

8. The LCD as claimed in claim 1, further comprising a protection layer disposed on the end portion of the second glass substrate.

9. The LCD as claimed in claim 8, wherein the protection layer is made of silica gel.

10. The LCD as claimed in claim 1, wherein the fixing member is made of metal or plastic.

11. The LCD as claimed in claim 1, wherein the frame is made of plastic material.

12. The LCD as claimed in claim 1, further comprising a flexible printed circuit board (FPCB), and a main PCB disposed at a side of the LCD distant from the LCD panel, wherein one terminal of the FPCB is connected to the end portion of the second glass substrate, and another terminal of the FPCB is connected to an edge portion of the main PCB.

13. The LCD as claimed in claim 12, wherein the backlight module further comprises a first diffusing sheet, a prism sheet, a second diffusing sheet, and a light guide plate, which are accommodated in the frame in that order from top to bottom.

14. The LCD as claimed in claim 13, wherein the backlight module further comprises a reflective sheet attached to the frame and being positioned adjacent to a bottom of the light guide plate.

* * * * *